United States Patent [19]
Benenate et al.

[11] 4,372,064
[45] Feb. 8, 1983

[54] POWER LAWN MOWER WITH DUMPING RECEPTACLE

[76] Inventors: Louis Benenate, c/o George Spector, 3615 Woolworth Bldg., 233 Broadway; George Spector, 3615 Woolworth Bldg., 233 Broadway, both of New York, N.Y. 10007

[21] Appl. No.: 230,665

[22] Filed: Feb. 2, 1981

[51] Int. Cl.³ .............................................. E02F 3/02
[52] U.S. Cl. ..................................... 37/117.5; 37/130; 298/1 C; 56/2; 294/51
[58] Field of Search ..................... 56/16.6, 12.9; 37/53, 37/45, 4, 5, 6, 124, 130, 126 R; 172/817, 14; 298/1 C, 2; 414/554; 294/55, 51, 49

[56] References Cited
U.S. PATENT DOCUMENTS

| | | | |
|---|---|---|---|
| 2,162,783 | 6/1939 | Moyer | 56/16.6 |
| 2,476,526 | 7/1949 | Badlat | 37/53 |
| 2,544,505 | 3/1951 | Kronhaus | 37/53 |
| 2,770,491 | 11/1956 | Perko | 298/1 C |
| 2,981,428 | 4/1961 | Noffsinger | 37/124 |
| 2,990,666 | 7/1961 | Blume | 56/16.6 |
| 3,021,625 | 2/1962 | Stasse | 298/1 C |
| 3,103,077 | 9/1963 | Bennett | 56/16.9 X |
| 3,199,277 | 8/1965 | Moody | 56/16.6 |

Primary Examiner—Richard J. Johnson

[57] ABSTRACT

A high wheeler type, power lawn mower having two additional bolt holes upon its rotary blade housing, and a dumpster removably mounted thereupon by two bolts through the holes, the dumpster including a stationary frame receiving the bolts, and a hopper hinged upon the frame so to be pivotable into either a position for carrying materials or dumping the same.

3 Claims, 6 Drawing Figures

U.S. Patent    Feb. 8, 1983    4,372,064
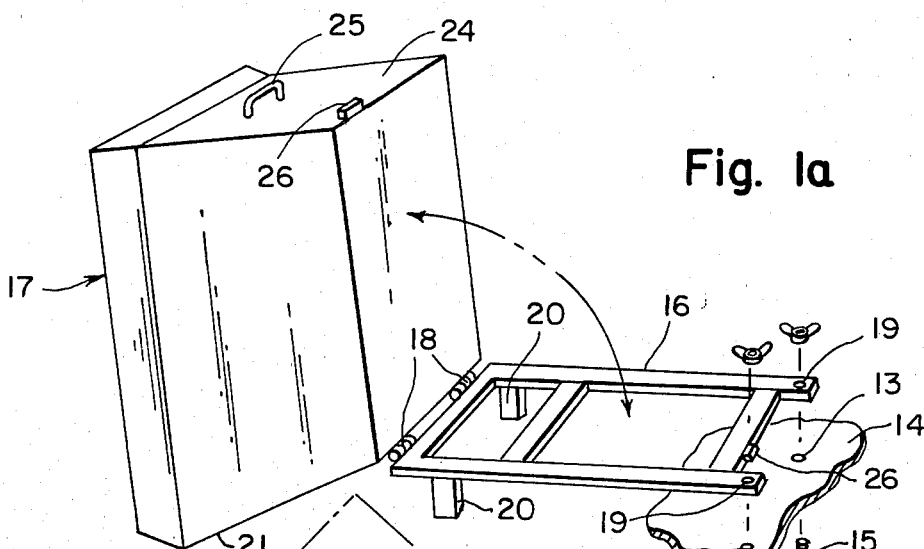
Fig. 1a
Fig. 2a
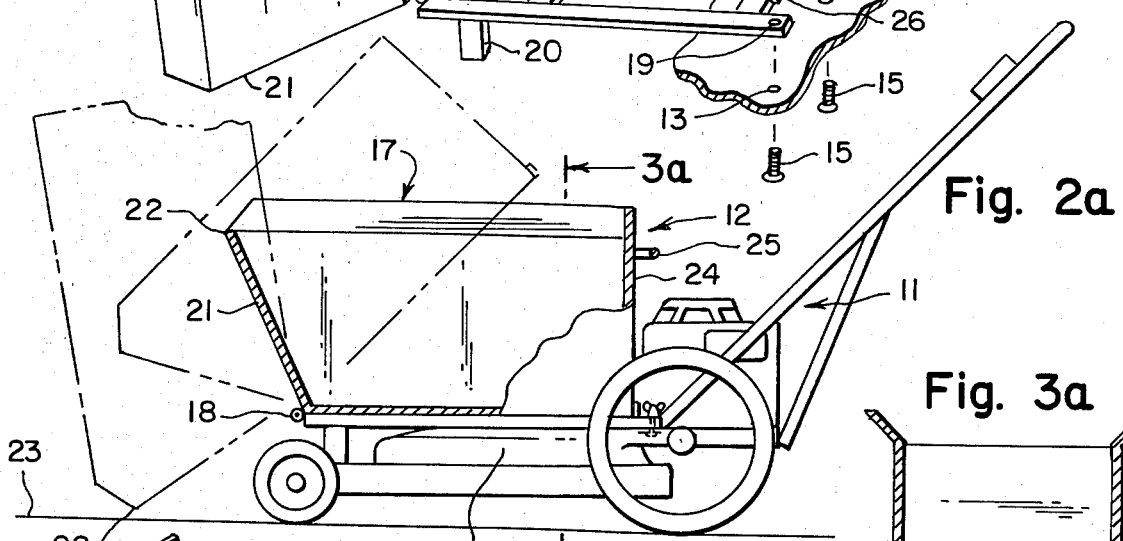
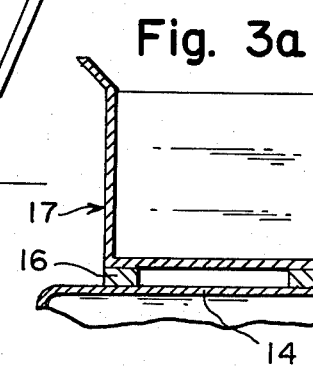
Fig. 3a
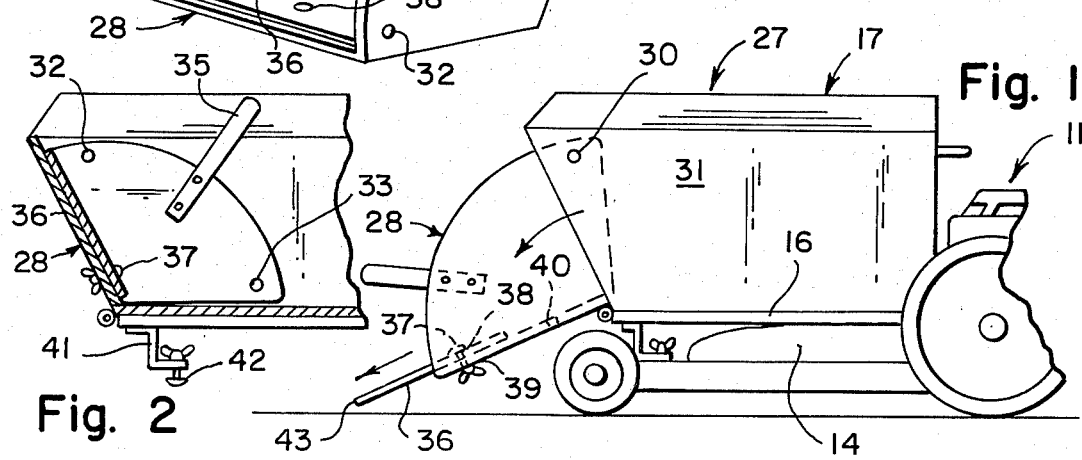
Fig. 3
Fig. 1
Fig. 2

POWER LAWN MOWER WITH DUMPING RECEPTACLE

This invention relates generally to attachments for power lawn mowers, particularly of the high wheeler type.

It is well known that yard and garden work may occassionally require the hawling of dirt, lawn cuttings, leaves and other materials from one place to another, and which may be heavy to lift and tiring to carry by hand, especially to persons who are not used to hard physical work or others who are not very strong such as women or older persons.

Accordingly, it is a principal object of the present invention to provide a dumpster attachment that can be readily and easily attached to a conventional power lawn mower, especially of high wheeler type, so that the mower serves to transport the material and dump it, without the physical exertion of doing the same by hand, such mowers being very popularly used today by many home owners so to be available for the additional chore of hauling.

Another object is to provide a high wheel dumpster which in one design thereof includes also a scoop for doing small bulldozing work or which serves as a gangplank for raking material directly into the hopper instead of lifting it thereinto by hand.

Yet a further object is to provide a dumpster which, with certain changes may be designed as an attachment for power lawn mowers of other type than a high wheeler type.

FIG. 1 is a fragmentary side view of one design of the invention installed on a rotary power mower, the design including a pivotable front end wall so to form a scoop, so that the mower thus also serves as a powered mini bulldozer to scoop up materials.

FIG. 2 is a fragmentary cross sectional view thereof, taken in the same place and showing the scoop in a retracted position.

FIG. 3 is a perspective view of the scoop and its forwardly extendable metal lip.

FIG. 1a is a perspective view of another design of the invention that does not include the above mentioned scoop.

FIG. 2a is a side cross sectional view thereof shown mounted on a rotary power mower.

FIG. 3a is a cross sectional view on line 3a—3a of FIG. 2a.

Referring now to the drawing in greater detail, and more particularly to FIGS. 1a, 2a and 3a thereof, at this time, the reference numeral 10 represents a high level dumpster assembly according to the present invention wherein there is a high wheeler type power lawn mower 11 and a dumpster 12 removably attachable thereupon.

The mower 11 is exactly a same as a conventional high mower type power lawn mower, except that it additionally includes two holes 13 drilled through a cover or top housing 14 thereof so that two, ¼ inch mounting bolts 15 may be received therethrough for mounting the dumpster thereupon.

The dumpster includes a frame 16 and a hopper 17 pivotally mounted on the frame by means of hinges 18 at one end thereof.

The frame includes a pair of holes 19 for receiving the mounting bolts, and the frame includes legs 20 for stabilizing the frame.

The hopper comprises a box which is open on its top, one end wall 21 being outwardly inclined toward a top lip 22 so when the hopper is tipped over (as shown by phantom lines in FIG. 2a) it rests upon a ground 23. The opposite end wall 24 of the box has a handle 25 for easy pivoting the same. A snap latch 26 may be provided for locking the hopper from tipping accidently.

In a modified design of the invention shown in FIGS. 1 through 3, the dumpster assembly 27 is a same as above described dumpster 10, except that instead of the box end wall 21, the hopper includes a scoop 28 pivoted on the hinges 18, the scoop being locked in either position by bolts 29 passed through a hole 30 in each side wall 31 of the box and selectively through either holes 32 or 33 of the scoop side walls 34. A handle 35 on the scoop provides easy tilting the scoop in either position. A strong, flat steel blade 36 can be adjusted on the scoop so to selectively be retracted (as shown in FIGS. 2 and 3, or extended as shown in FIG. 1) so to form a scraping lip, if the lawnmower is of self-powered typed so that it can be used for doing small bulldozing work such as scraping a ground surface or the like. The blade is secured in either position by a single bolt 37 through a hole 38 of the blade and either hole 39 or 40 of the scoop. Additionally instead of legs 20, the scoop rests of brackets 41 that serve as legs when the device is used as a dumpster, but which may be rigidly secured to the mower by means of bolts 42 when doing bulldozing work, the mower accordingly also including additional drilled holes to receive the bolts 42. In bulldozing position, the blade edge 43 just touches a ground surface when the mower stands on level ground, as shown in FIG. 1.

While various changes may be made in the detail construction, it is understood that such changes will be within the spirit and scope of the present invention as is defined by the appended claims.

What is claimed is:

1. A high wheel dumpster assembly, comprising in combination, a high wheeled rotary power lawn mower, and a dumpster mounted thereupon comprising a frame bolted thereto and a hopper pivotably mounted on a front end of said the frame, and means for said hopper to be used for bulldozing work wherein said hopper includes a handle at one end for tilting said hopper wherein said means comprises a scoop pivotably secured to said hopper and forming an end wall thereof pivotable relative to said hopper to an outward position and to an inward position including means for locking said scoop in said inward position.

2. A dumpster as in claim 1 wherein said end wall has retractible scraper mounted thereon.

3. A dumpster as in claim 2 wherein the dumpster has legs at the said end supported by the mower body.

* * * * *